(12) United States Patent
Madhav

(10) Patent No.: US 8,477,215 B2
(45) Date of Patent: Jul. 2, 2013

(54) WIRELESS DATA MODULE FOR IMAGING SYSTEMS

(75) Inventor: Arun Madhav, Thousand Oaks, CA (US)

(73) Assignee: Eka Technologies, Inc., Thousand Oaks, CA (US)

( * ) Notice: Subject to any disclaimer, the term of this patent is extended or adjusted under 35 U.S.C. 154(b) by 299 days.

(21) Appl. No.: 12/969,417

(22) Filed: Dec. 15, 2010

(65) Prior Publication Data

US 2012/0154605 A1  Jun. 21, 2012

(51) Int. Cl.
*H04N 5/232* (2006.01)
*H04N 5/76* (2006.01)

(52) U.S. Cl.
USPC ..................... 348/231.3; 348/211.2

(58) Field of Classification Search
USPC ............ 348/211.2, 211.4, 231.99, 231.3, 348/231.5, 231.7, 231.9
See application file for complete search history.

(56) References Cited

U.S. PATENT DOCUMENTS

| | | | | |
|---|---|---|---|---|
| 7,430,003 | B2 * | 9/2008 | Nichols et al. | 348/231.3 |
| 7,975,075 | B2 * | 7/2011 | Lee et al. | 710/10 |
| 2005/0046706 | A1 * | 3/2005 | Sesek et al. | 348/231.3 |
| 2009/0135274 | A1 * | 5/2009 | Kim et al. | 348/231.5 |
| 2010/0026382 | A1 * | 2/2010 | Higaki et al. | 327/544 |
| 2010/0214443 | A1 * | 8/2010 | Wang et al. | 348/231.3 |
| 2011/0085057 | A1 * | 4/2011 | Takahashi | 348/231.3 |
| 2012/0191755 | A1 * | 7/2012 | Naaman et al. | 707/770 |

* cited by examiner

*Primary Examiner* — Timothy J Henn
(74) *Attorney, Agent, or Firm* — Richard T. Ogawa; Ogawa P.C.

(57) ABSTRACT

This present application is directed to imaging devices and methods thereof. More specifically, embodiments of the present invention provides a portable data device with that is capable of capturing location information and capable of wirelessly connecting to one or more imaging devices. The portable data device is configured to, among other things, associate location information and/or other information with images and/or or videos captured by imaging devices. In various embodiments, the present invention provides a portable data device that includes, among other things, location module, a wireless interface, a battery, and a user interface.

10 Claims, 8 Drawing Sheets

US 8,477,215 B2

WIRELESS DATA MODULE FOR IMAGING SYSTEMS

CROSS-REFERENCES TO RELATED APPLICATIONS

Not Applicable

STATEMENT AS TO RIGHTS TO INVENTIONS MADE UNDER FEDERALLY SPONSORED RESEARCH AND DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present application is directed to imaging devices and methods thereof. More specifically, embodiments of the present invention provides a portable data device with that is capable of capturing location information and capable of wirelessly connecting to one or more imaging devices. The portable data device is configured to, among other things, associate location information and/or other information with images and/or or videos captured by imaging devices. In various embodiments, the present invention provides a portable data device that includes, among other things, location module, a wireless interface, a battery, a user interface, and a controller module for coordinating operations of various components. There are other embodiments as well.

Over the last few decades, the use of digital imaging devices proliferated. Pocket-sized digital cameras and digital SLRs gradually replaced traditional filmed based cameras. In addition, various types of electronics have incorporated imaging modules. For example, cellular phones, MP3 players, computers, and many other types of devices have the ability to capture images and/or videos.

As digital images and videos become more and more popular, their uses extended. Traditionally, images were captured by film, developed in dark rooms, and printed on photographic papers. With advent of digital imaging, more and more pictures are digitally captured and shared online. Moreover, online sharing of images and/or videos are not limited to the sharing these images and/or videos themselves. Often, it is desirable to share information associated with the shared images and/or videos. For example, it is a desirable to have images embedded with location information. Online photo sharing websites, where location information is available, can display images and their corresponding locations on maps.

Image capture devices existing today typically have limited ability to embed information into digitally captured images and/or videos. For example, information such as date, exposure data, and others, can be embedded into images. Unfortunately, the ability of image capture devices for embedding information is limited, by both hardware and software. For example, it is often desirable to have location information embedded into images at the time of image capture, but most cameras lack the required hardware modules for location capturing (e.g., GPS receivers). In addition, most cameras lack hardware that allows users to conveniently enter information. For example, to enter a text string associated with an image, a user often has to go through a long and burdensome process to enter one letter at a time.

Therefore, it is desirable to have improved data module systems that are configured to embed information into images and/or videos.

BRIEF SUMMARY OF THE INVENTION

The present application is directed to imaging devices and methods thereof. More specifically, embodiments of the present invention provides a portable data device with that is capable of capturing location information and capable of wirelessly connecting to one or more imaging devices. The portable data device is configured to, among other things, associate location information and/or other information with images and/or or videos captured by imaging devices. In various embodiments, the present invention provides a portable data device that includes, among other things, location module, a wireless interface, a battery, and a user interface.

According to an embodiment, the present invention provides a data processing device. The device includes a housing. The device also includes a battery positioned within the housing. The device additionally includes a wireless communication interface that is adapted to wirelessly send and receive data with one or more imaging devices. The device further includes a location module that is configured retrieve position information from at least three or more entities. The entities can be GPS satellites and/or ground-based location reference points. The device further includes a memory module being configured to store at least the location information. The location module can also be used to store other information, such as wireless connection information, device information, and others. The device includes a processor that is configured to receive a first signal from a first imaging device. The first signal indicates capturing of one or more images at a first time. The processor also receives a first set of data from the image device via the wireless communication interface. The processor further obtains a first location information from the location module. The processor generates a second set of data, the second set of data including an association between the first set of data and the first location information. The processor stores the second set of data.

The device can also comprise a data storage module for storing images captured by the first image device.

The device of may additionally comprises a hot-shoe adapter coupled to the housing, the hot-shoe adapter being configured to secure the device onto a camera. The hot-shoe adapter can also be used by the camera to send an electrical signal to indicate capturing one or more images.

In an embodiment, the device further comprises a display that is configured to show at least status information.

The wireless communication interface can be associated with one or more WIFI standards. The wireless communication interface can also be associated with one or more Bluetooth™ standards.

The location module may comprise a GPS receiver, an accelerometer module, and/or a gyroscope. For example, the location module is configured to perform a triangulation process. The location module can also use ground based wireless devices like Wi-Fi to determine the location information. In addition, devices such as magnetometer and altimeter can be used to determine the exact direction and altitude.

In certain embodiments, the device further comprises flash triggering module. The processor can be further configured to generate a track log based one or more location information.

The device may also include a barcode scanning module, and the processor is configured to receive bar code data from the barcode scanning module and store the bar code data as a part of the second set of data. The device can also include a USB interface for connecting to a computer device. As an example, the processor is configured to establish a connection with a computer device. In another example, the processor is configured to wake up the data processing device in response to the receiving the first signal. The processor can be used to establish a secured wireless connection with the first imaging device via the wireless communication interface.

In certain embodiments, the device further comprises a voice recording module and/or a touch screen display module that is adapted to receive user input.

According to another embodiment, the present invention provides an apparatus for associating location information with images. The apparatus includes a housing. The apparatus also includes a battery positioned within the housing. The apparatus includes a wireless communication interface that is adapted to wirelessly send and receive data with one or more imaging devices. The apparatus includes a location module that is configured retrieve position information from at least three or more entities (e.g., GPS satellites). The apparatus includes a memory module being configured to store at least the location information and configuration information associated with one or more imaging devices. The apparatus also includes a user interface module for receiving user inputs. The apparatus also includes a display module. For example, the display module can be a part of the user interface module and function as a visual feedback element. The apparatus includes a processor that is configured to receive a first signal from a first imaging device. The first signal indicates capturing of one or more images at a first time. The processor also verifies a first configuration information associated with the first imaging device. The processor receives a first set of data from the image device via the wireless communication interface. The processor obtains a first location information from the location module. The processor generates a second set of data that include an association between the first set of data and the first location information. The processor stores the second set of data. The apparatus also includes a power control module that is configured to activate the apparatus in response to the first signal.

In various embodiments, the processor is configured to broadcast a wireless signal through the wireless communication interface, receive a response from the first imaging device, establish connection with the first imaging device, and store a configuration profile associated with the first imaging device.

According to yet another embodiment, the present invention provides a method for embedding location information into digital files. The method includes providing a portable apparatus that has a location module and a wireless interface. The method includes receiving a first message by the portable apparatus via the wireless interface. The first message includes wireless configuration information associated with the first portable apparatus. The method also includes receiving a second message from a first imaging device by the portable apparatus via the wireless interface. The second message is a response to the first message, the second message including wireless configuration information associated with the first imaging device. The method includes determining the wireless configuration information by the portable apparatus. As an example, the portable apparatus performs a handshake process. The handshake process between the wireless interfaces of the two portable devices depends on the type of the communication protocol used. In other words the source and destination of the first and second messages described can vary depending on the communication protocol used.

The method further includes receiving a third message from the first imaging device by the portable apparatus via the wireless interface. The third message indicates capturing of one or more images by the first imaging device. The method includes forming a wireless connection between the portable apparatus and the first imaging device. The method includes determining a first location by the portable apparatus using the location module. The first location is determined within a predetermined period from receiving the third message, the predetermined period being less than ten minutes. The method includes generating a first file by the portable apparatus. The first file includes at least an identification information associated with the one or more images and the first location. The method includes storing the first file by the portable apparatus. In certain embodiments, the method includes receiving one or more user inputs. The method also includes generating a set of data based on the user input. The method further includes embedding the set of data into the first file. The method may also include forming a connection between the portable apparatus and a computing device and sending the first file to the computing device. The method can also includes receiving a first image file by the portable apparatus from the first imaging device via the wireless interface, embedding the first location into the first image file, and storing the first image file by the portable apparatus. In an embodiment, the method includes forming a wireless connection between the portable apparatus and a second imaging device, the second imaging device being adapted to capture videos. The method may also comprise waking up the portable apparatus from a power saving mode in response to receiving the third message. For example, the process of establishing a communication link between the portable device and the imaging device can be referred to as a handshake process.

In various embodiments, the first imaging comprises an Eye-fi device. The location module comprises a GPS receiver for receiving GPS signals from three or more satellites. For example, the location module is adapted determine the first location by triangulating wireless signals.

The portable apparatus may further include a housing, the housing being characterized by a total volume of less than 30 cubic inches. The portable apparatus includes a battery, a processor module, and a storage module. The apparatus may include a display for showing various information. The display can be based on LCD, OLED, or other technologies. The wireless interface can be in compliance with Bluetooth or WIFI wireless standards. Other wireless standards, such as Zigbee, MiWi, wireless interfaces can be used by the wireless interface as well. For example, the storage module may comprise a flash memory and/or a hard disk.

It is to be appreciated that embodiments according to the present invention offer various advantages over conventional techniques. For example, the embodiments of the present invention provide an efficient solution for adding location information images. Compared to conventional portable GPS dongles, where location information is synchronized later to images based on time stamp, GPS modules according to the present invention is easier to use and provides more accurate information. Furthermore, embodiments of the present invention can be integrated into conventional systems with ease. For example, various embodiments of the present invention can be used with existing imaging capturing devices. As another example, various embodiments are implemented with currently available hardware components, such as hardware decoders, memory components, etc. There are other benefits as well.

Various additional objects, features and advantages of the present invention can be more fully appreciated with reference to the detailed description and accompanying drawings that follow.

DETAILED DESCRIPTION OF THE INVENTION

The present application is directed to imaging devices and methods thereof. More specifically, embodiments of the present invention provides a portable data device with that is capable of capturing location information and capable of wirelessly connecting to one or more imaging devices. The portable data device is configured to, among other things, associate location information and/or other information with images and/or or videos captured by imaging devices. In various embodiments, the present invention provides a portable data device that includes, among other things, location module, a wireless interface, a battery, and a user interface. There are other embodiments as well.

Figure 1A:
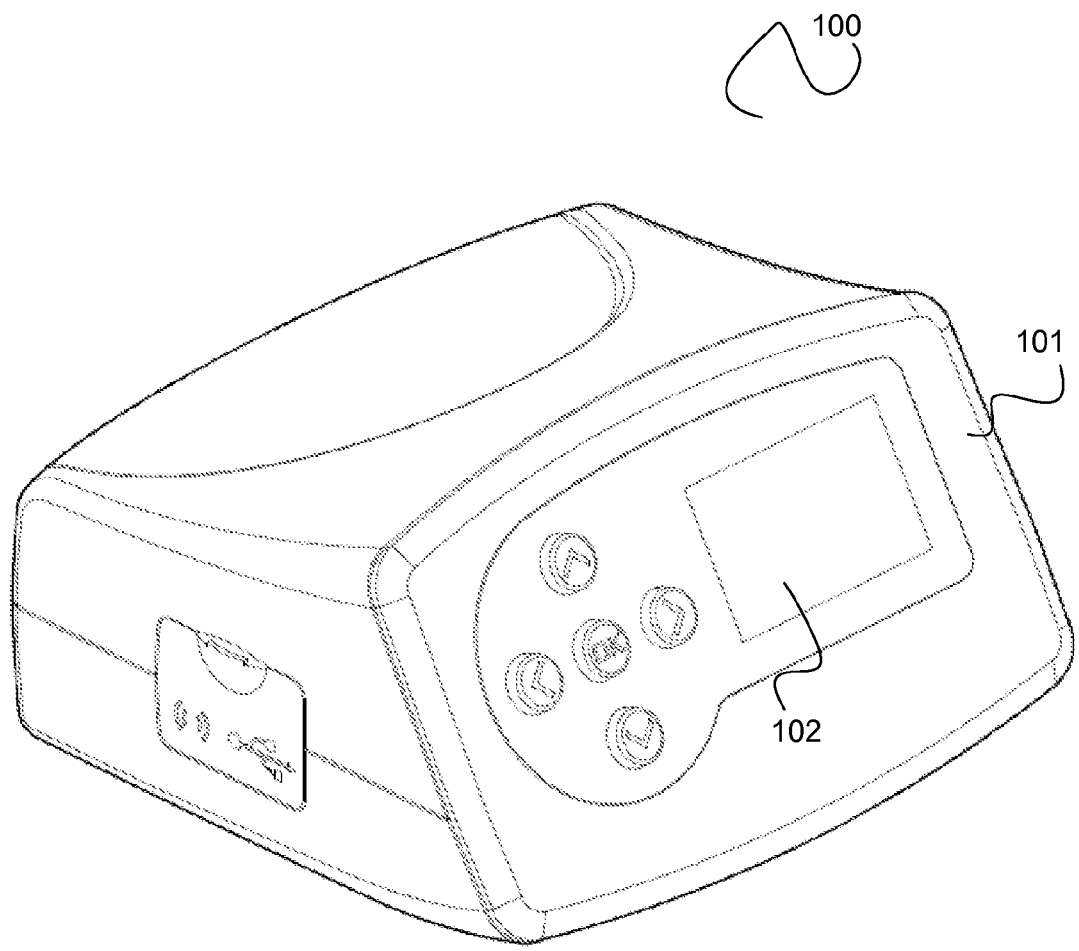
FIGS. 1A-E are simplified diagram illustrating a GPS module 100 according to an embodiment of the present invention.

FIG. 1A is a simplified diagram illustrating a GPS module 100 according to an embodiment of the invention. This diagram is merely an example, which should not unduly limit the scope of the claims. One of ordinary skill in the art would recognize many variations, alternatives, and modifications. The GPS module 100 as shown in FIG. 1 includes a user interface at its front side 101. The user interface includes a display 102 and buttons for receiving user inputs. In a preferred embodiment, the display 102 comprises an OLED display, which is capable to display file names, system status, batteries status, and/or others. In a specific embodiment, the display 102 comprises a color display that displays images and information thereof. For example, the GPS module 100 is configured to download images from imaging devices, and the downloaded images are display on the display 102.

The buttons as shown in FIG. 1A at the front side 101 are used to receive user inputs. For example, a user can use the arrow keys to navigate a system menu displayed on the display 102 and confirm user selection using the "OK" button. In a specific embodiment, the display 102 is configured to receive user input and the buttons are not needed.

Figure 1B:
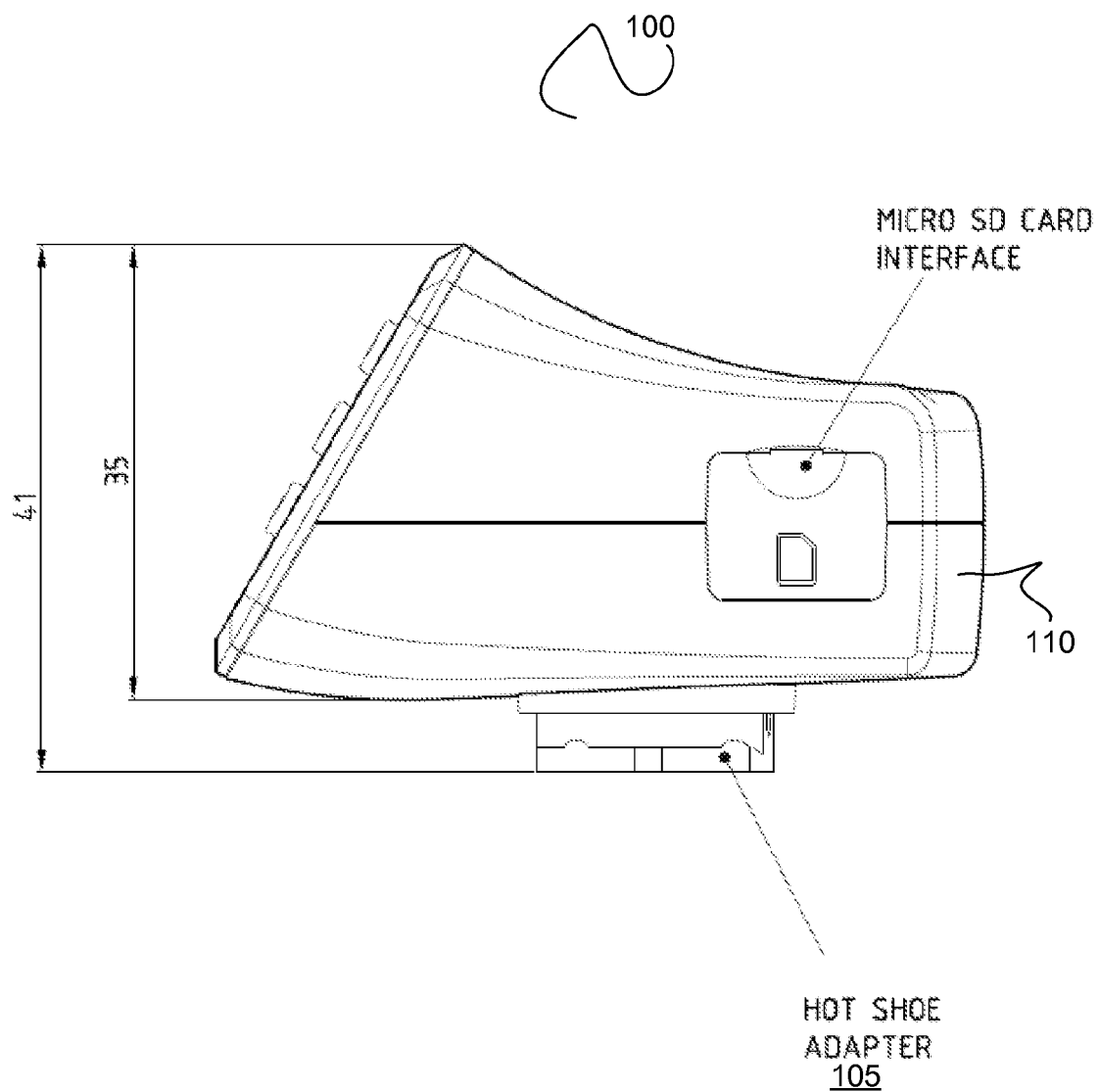

FIG. 1B is a simplified diagram illustrating a side view 110 of the GPS module 100. This diagram is merely an example, which should not unduly limit the scope of the claims. One of ordinary skill in the art would recognize many variations, alternatives, and modifications. As shown in FIG. 1B, the GPS module 100 comprises a micro SD card interface 111. In a preferred embodiment, the GPS module 100 is configured to download images and/or other files via the card interface 111. For example, the GPS module 100 stores images from the SD card and functions as portable storage unit. It is to be understood that the GPS module 100 may include other media readers as well, such as compact flash reader, SD card reader, memory stick card reader, mini SD card reader, etc.

As can be seen from FIG. 1B, the GPS module also includes a hot shoe adapter 105. The adapter 105 is compatible with industry standard hot shoe mounting systems, which allows the GPS module 100 to be physically attached to a camera or camcorder that has a hot shoe mount. In an embodiment, the adapter 105 is configured to attach the GPS module 100 to an imagining devices and the adapter 105 is not used for transfer information. In various embodiments, the adapter 105 is electrically coupled to a camera and adapted to receive information from the camera. For example, the GPS module 100 receives a flash signal through the adapter 105, and in response the GPS module 100 triggers one or more external flash units. In certain embodiments, the GPS module 100 receives information related to newly captured images and/or videos through the adapter 105. The hot-shoe adapter can also be used to send an electrical signal to the portable device indicating an first set data capture.

Figure 1C:
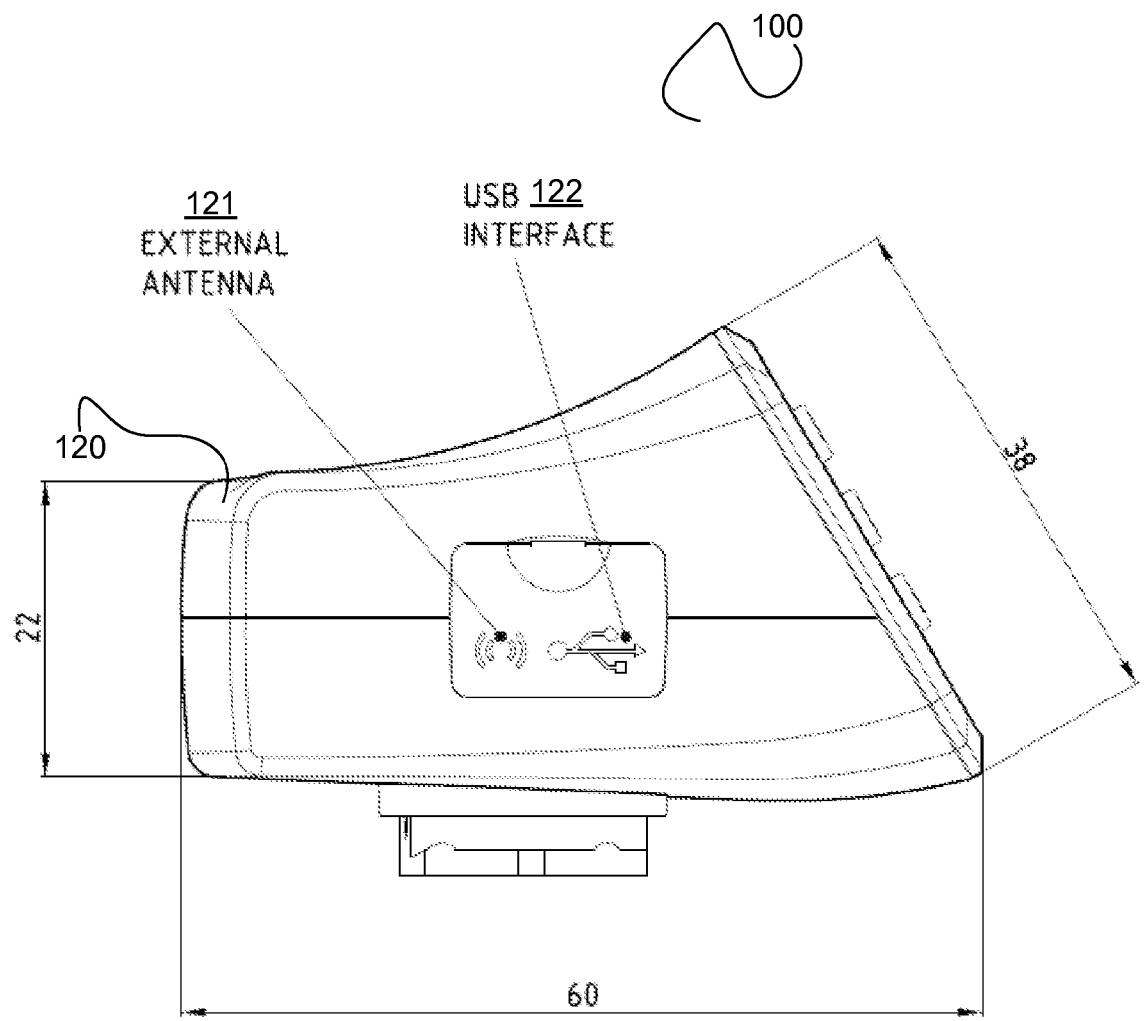

FIG. 1C is a simplified diagram illustrating a side view 120 of the GPS module 100. This diagram is merely an example, which should not unduly limit the scope of the claims. One of ordinary skill in the art would recognize many variations, alternatives, and modifications. As shown in FIG. 1C, the side 120 includes an external antenna 121 and a USB interface 122. The GPS module 100 is configured to communicate with other devices through the USB interface 122. It is to be appreciated that depending on the application, other types of wired communication interfaces may be used as well, such as micro USB interface, mini USB interface, RJ45 Ethernet interface, and others. In various embodiments, the GPS module 100 connects to one or more computers to upload image data and other information, and to download software updates. Depending on the application, the USB interface 122 can also be used to connect to other devices, such as bar code scanners, imaging devices, input devices, display devices, and others.

The external antenna 121 is a part of the wireless interface of the GPS module 100. Similar to the USB interface 122, the external antenna 121 allows the GPS module 100 to communicate with a variety of devices, such as computers, imaging devices, input devices, display devices, and others. For example, the GPS module is able to wirelessly communicate to other devices using different types of communication protocols, such as 802.11. Bluetooth, RF, ZigBee, and others.

Figure 1D:
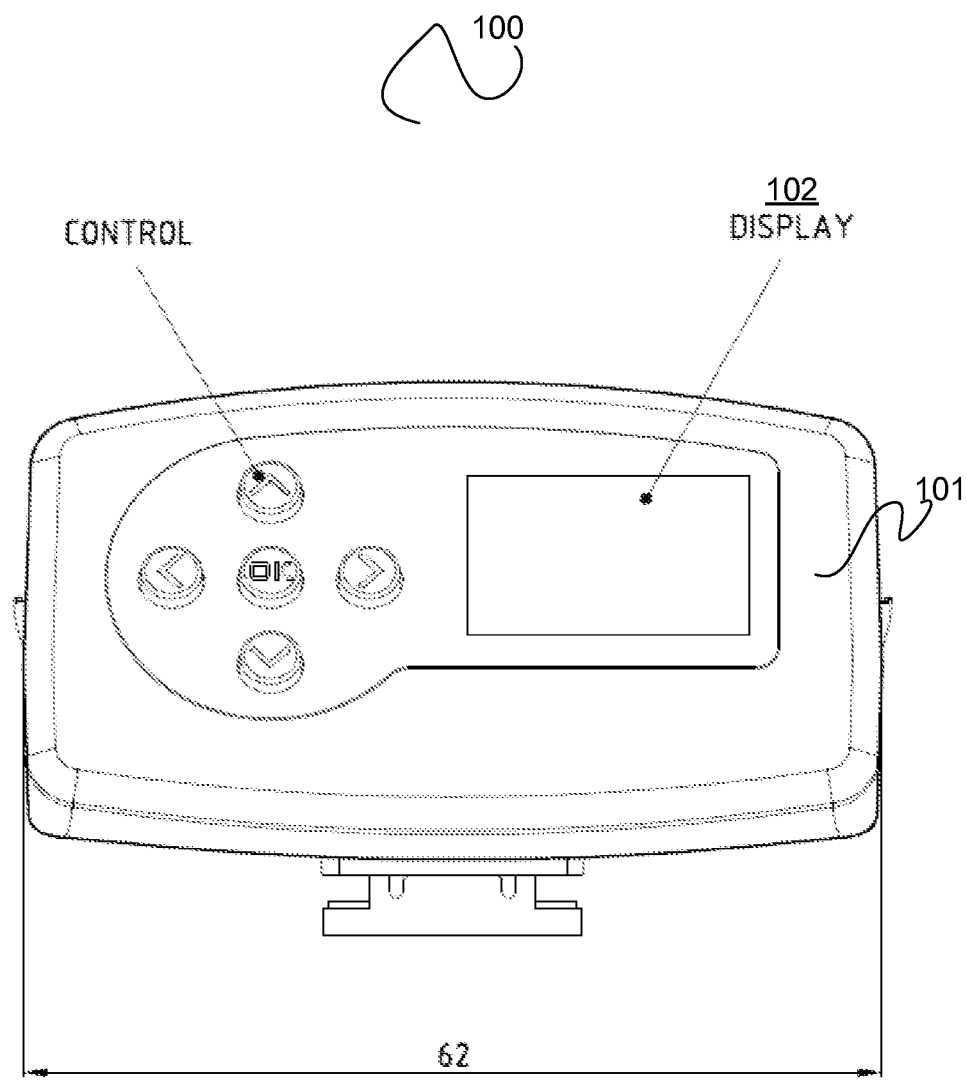

FIG. 1D is a simplified diagram illustrating the front side 101 of the GPS module 100 according to embodiments of the present invention. This diagram is merely an example, which should not unduly limit the scope of the claims. One of ordinary skill in the art would recognize many variations, alternatives, and modifications.

Figure 1E:
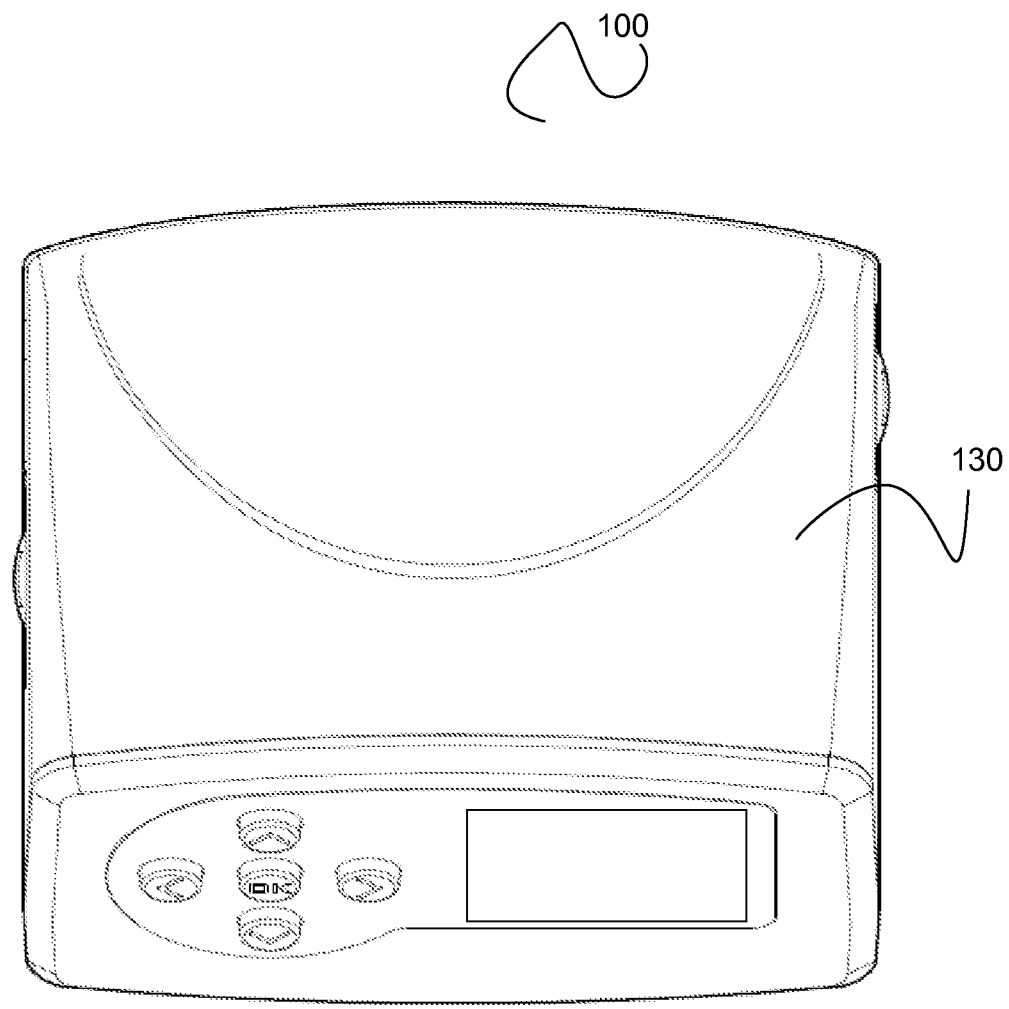

FIG. 1E is a simplified diagram illustrating the top side 120 of the GPS module 100 according to embodiments of the present invention. This diagram is merely an example, which should not unduly limit the scope of the claims. One of ordinary skill in the art would recognize many variations, alternatives, and modifications.

Figure 2:
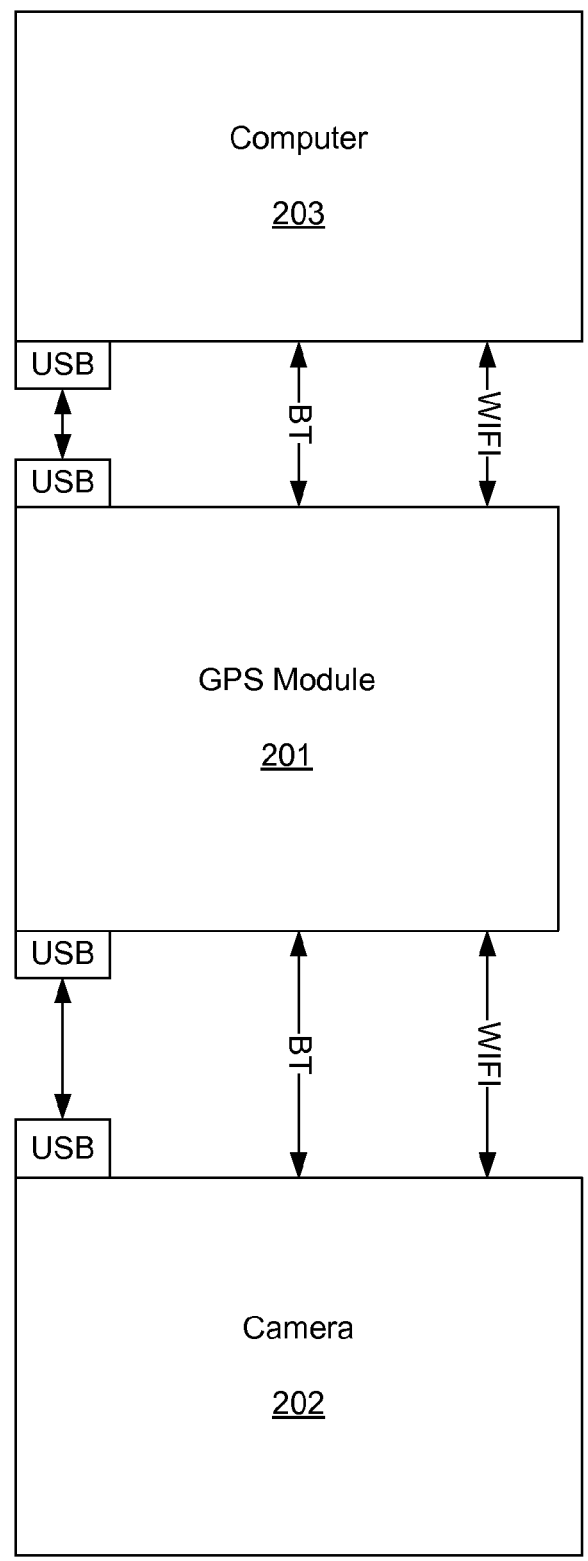
FIG. 2 is a simplified diagram illustrating operation of a GPS module 201 according to an embodiment of the present invention.

FIG. 2 is a simplified diagram illustrating operation of a GPS module 201 according to an embodiment of the present invention. This diagram is merely an example, which should not unduly limit the scope of the claims. One of ordinary skill in the art would recognize many variations, alternatives, and modifications. As shown in FIG. 2, a GPS module 201 is configured to communicate with the camera 202 and the computer 203. For example, the GPS module 201 is wirelessly connected to the camera 202. Depending on the application, the camera 202 can be WIFI and/or Bluetooth capable by itself or WIFI enabled by an EyeFi card. When the camera 202 captures an image, the camera 202 notifies the GPS module 201 wirelessly or through a wired interface. The GPS module 201 wakes up (if it were in a sleep or power saving mode) and receives image data. The image data include, among other things, EXIF data of the image. In a specific embodiment, the image data also include the captured image itself. The GPS module 201 retrieves location information using its GPS receiver and associates the location information with the captured image. In certain situations, the GPS module 201 does not have location information at the time when the image data are received. In such case, the GPS module 201 retrieves the location information using the GPS receiver within a predetermined period of time (e.g., ten minutes) and associates the later retrieved location information to the captured image.

As mentioned above, the GPS module 201 can be used to associate various types of information to the captured image. In one embodiment, the GPS module 201 is coupled to a barcode scanner, and the GPS module 201 is configured to associate one or more scanned bar codes with the captured image. Depending on the application, the GPS module 201 can be coupled to other devices as well, wirelessly or through wired connection.

In certain embodiments, the GPS module 201 downloads images captured by the camera 202 and embeds location information into the downloaded images. For example, the GPS module 201 stores the captured images into its storage and updates the EXIF portion of the capture images (e.g., for images that are in JPEG format). In case the captured image is in JPG format, data attributes, memo fields, location information, and/or user entered information is added to the image's corresponding fields (which can be custom fields). Later when connected to the computer 203, the GPS module uploads the images that are already embedded with location information.

In various embodiments, the GPS module 201 does not download captured images from the camera 202. Instead, the GPS module 201 retrieves certain information (e.g., file name, image time stamp, etc.) from the captured image. In a specific embodiment, the GPS 201 comprises storage that stores one or more tables that correlate captured images with location information. When GPS module 201 is connected to the computer 203, the GPS module 201 uploads data related to the captured images to the computer 203. For example, the computer 203 has a specific program installed that downloads images from the camera 202 and obtains location data from the GPS module 201. The computer 203 updates the captured images downloaded from the camera 202 with the location data from the GPS module 201.

Figure 3:
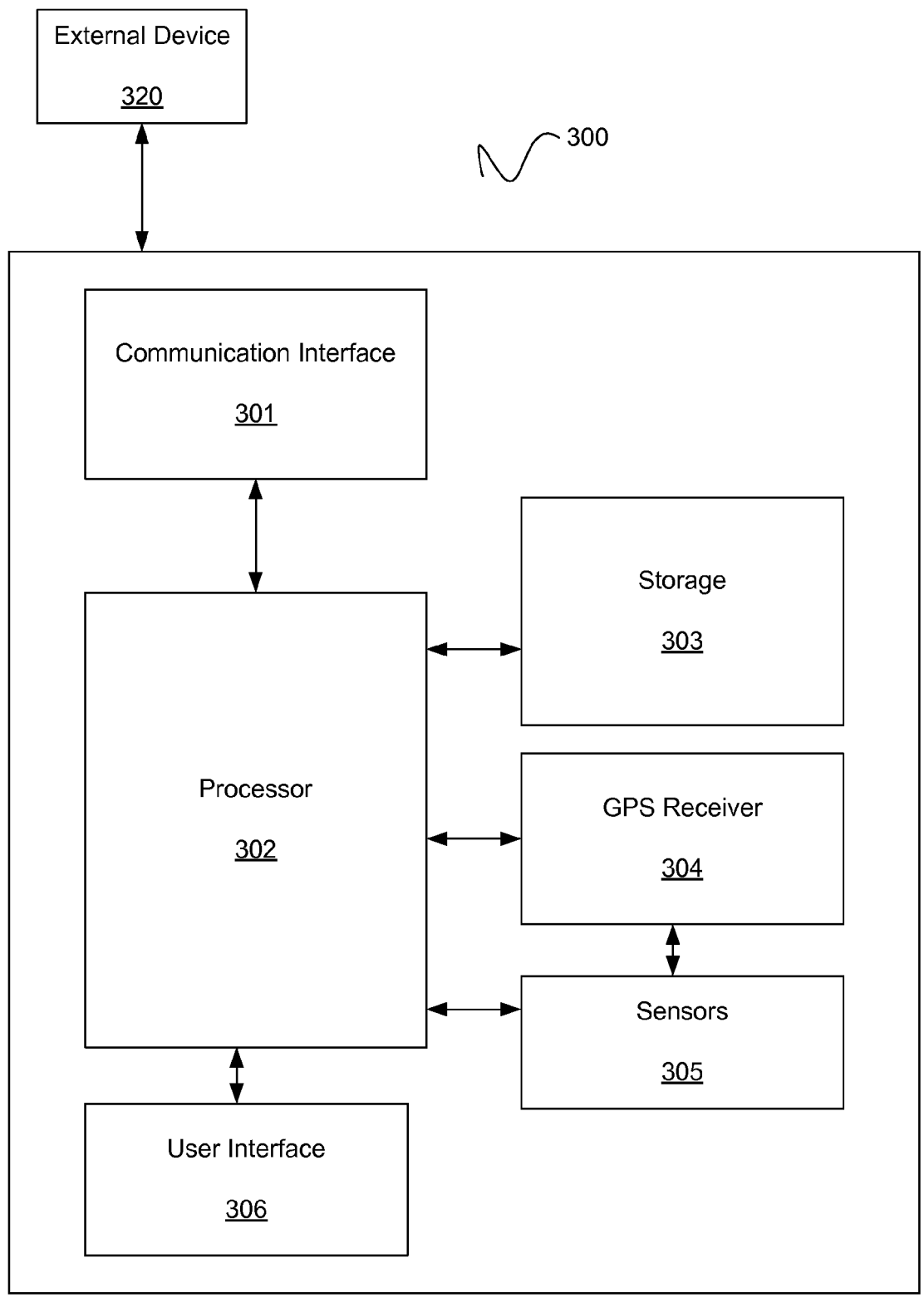
FIG. 3 is a simplified diagram illustrating a GPS module 300 according to an embodiment of the present invention.

FIG. 3 is a simplified diagram illustrating a GPS module 300 according to an embodiment of the present invention. This diagram is merely an example, which should not unduly limit the scope of the claims. One of ordinary skill in the art would recognize many variations, alternatives, and modifications. As shown in FIG. 3, the GPS module 300 includes the following components:

1. Communication interface 301;
2. processor 302;
3. storage 303;
4. GPS receiver 304;
5. sensors 305; and
6. user interface 206.

The communication interface 301 is adapted to communicate with one or more devices, such as the external device 320. As explained above, the external device 320 can be a computer, a camera, a camcorder, a bar code scanner, a user input device, a display, others.

The communication interface 301, depending on the application, is adapted to communicate through wired connections or to communicate wirelessly. As explained above, the communication interface 301 may include wired communication interface such as USB port, Firewire port, RJ45 port, and others. The communication interface 301 may also communicate using various types of wireless standards, such as 802.11, Bluetooth, RF network, infrared, ZigBee, and others. For example, the communication 301 includes a wired hardware module and a wireless hardware module.

As shown in FIG. 3, the GPS module 300 is connected to an external device 320 via the communication device 301. Depending on the application, the external device 320 can be a computer, a camera, a cellular phone, a portable organizer, a personal media player, a camera flash unit, a display, a user input unit, and others.

One of the functions of the GPS module 300, as the name implies, is to provide location information. In various embodiments, location information is determined using GPS receiver 304 and/or other components, such as the sensor component 305. In an embodiment, the GPS receiver 304 receives GPS coordinates from GPS satellites, and processor 302 processes the coordinate information and determines the location using the coordinate information. In certain embodiments, location is determined by both GPS coordinate and other information, such as motion detected by the sensor module. For example, the sensor module 305 comprises accelerometer sensor that provides motion information. Using both the GPS and accelerometer information, the GPS module 300 can accurately determine the location. It is to be appreciated that the sensor module 305 may also include other types of sensors, such as altimeter sensors, compasses, and/or others.

In certain embodiments, the GPS module 300 can also use other information to determine location information. For example, the GPS module 300 determines location by triangulating radio signals. Radio signal triangulation can be particularly useful if the GPS module 300 is at an indoor location and GPS satellite signals are hard to obtain.

The GPS module 300 is configured to embed location information into images and/or videos captured by one or more imaging devices. For example, once an image or video is captured, the image capturing device sends information related to the captured image to the GPS module 300 via the communication interface 301. The GPS module 300, in response to the image information received, obtains location information. As described above, the location information can be determined by the GPS receiver 304 and the processor 302, or by other sensors as well. The processor 302 then correlates the location information with the image information. The correlation information between the image and the location is then stored at the storage 303. For example, the storage may include a solid state memory, a hard disk, and/or others.

Depending on the application, the correlation information can be stored in various ways. In an embodiment, the processor 302 creates a file (if such file does not exist already) associated with the image capturing device. The file stores, among other thing, image information and the location information associated with the image. For example, the image has a file name "DSC001". The file contains a table that has an entry "DSC001"->"location 1". In various embodiments, various types of file and/or table formats may be used. Later, the location information can be synchronized back to corresponding images by a computer and/or other devices. For example, images and the correlation files are uploaded to a computer, and the computer updates the images with the corresponding location information.

In certain embodiments, captured images are downloaded from an image capturing device to the GPS module 300. For example, the GPS module 300 receives the captured images via the communication interface. The downloaded image contains a header section that contains various information related to the images. For example, the header section can be a part of the exchange image file format (EXIF) information. The header section may contain information such as image file name, capture time, camera model, and others. In various embodiments, the location information is stored in a predetermined location of the header section. The processor 302 processes the image file and modifies the header section of the image by adding location information to this predetermined location of the header section.

In various situations, the location information is not always readily available. For example, the GPS module 300 is activated when an image is captured. At the time of activation, the GPS receiver 304 does not have updated location information, as sometimes it takes minutes to lock onto GPS signals. For example, the process of receiving GPS signals and determining the location may take from few seconds to minutes. In such case, location information is associated with or added to image files only if such location information is obtained within a predetermined time of image capture.

The GPS module 300 can also be used to add other types of information to images. In various embodiments, the GPS module 300 comprises a microphone for recording voice memos that are to be added to images. The GPS module 300 can also be used with various types of user input or sensor devices, such as a bar code scanner, to add other types of information to images.

As shown in FIG. 3, the GPS module 300 also includes a user interface 306. The user interface 306 can be used to display information and/or receive user inputs. For example, the user interface 306 includes a display (e.g., LCD or OLED) that shows, among other things, images being processed and device status. User inputs may include image selection, menu selection, text input, and others. For example, user interface 306 can include a touch screen display that both display information and receive user inputs.

It is to be appreciated that the GPS module 300 can be configured to perform a variety of functionalities. For example, the GPS module 300 can be used to send a radio signal to flash units to remotely set off one or more flash units during an image capturing process. In addition, the GPS module 300 can also be used for tracking GPS locations. For example, location information is determined and stored at specific time intervals. Where successive images are capture within a predetermined period of time (e.g., a session of two hours), relative time of successive capturing of images is used for geotagging.

The external device can be any digital devices capable of taking pictures. For example, a digital device can be a digital camera, camera enabled phone, or PDA will be used to capture a picture and store them in memory. These digital devices are capable of communicating with other digital devices via USB, Bluetooth, WiFi (802.11), and/or ZigBee (collectively called wireless technologies) with either an internally enabled wireless technology or an external module.

Often, for a digital device to wirelessly communicate with other devices, a wireless technology module is needed. A wireless technology module can be available in the form of SD card, miniSD, microSD, memoryStick, or compact flash ("CF") card that have wireless communication capabilities.

For example, the wireless technology modules can also have internal memory storage available. In various embodiments, these modules are modified (firmware or hardware modification to send an activity notification) to send an indication of an activity (example: as soon as a file is written to memory) or send the contents of the memory (in batch or file by file) on these wireless technology modules to the GPS module 300. Once a picture is stored in the memory, information about this picture is transmitted to the GPS module. This transfer can take place via the camera device enabled USB, RF, Bluetooth, Zigbee, 802.11 (WiFi) modules or an SD/MMC/SDIO card based 802.11 (WiFi), Bluetooth, or RF capability. In a preferred embodiment, a wireless technology module comprises an EyeFi card.

Figure 4:
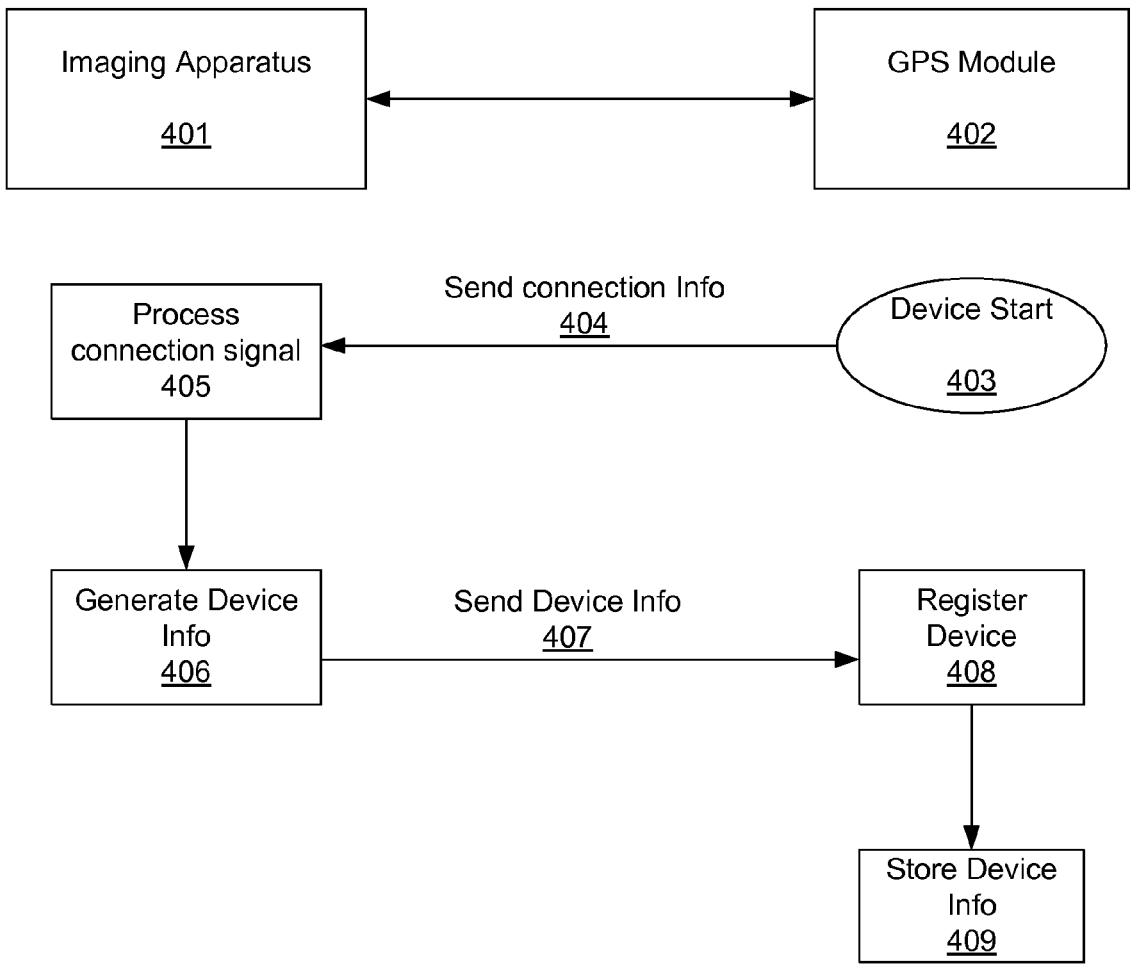
FIG. 4 is a simplified flow diagram illustrating a process for establishing a connection between an imaging apparatus 401 and a GPS module 402 according to embodiments of the present invention.

FIG. 4 is a simplified flow diagram illustrating a process for establishing a connection between an imaging apparatus 401 and a GPS module 402 according to embodiments of the present invention. This diagram is merely an example, which should not unduly limit the scope of the claims. One of ordinary skill in the art would recognize many variations, alternatives, and modifications. As an example, the flow diagram in FIG. 4 is sometimes referred to as a handshake process. The GPS module 402 starts up at step 403. At the startup, the GPS module 402 initializes itself and sends connection information. In a specific embodiment, the GPS module 402 starts in a wireless broadcast/discovery mode in order to connect to (e.g. or "pairing to") one or more external devices, such as a WIFI enabled camera. At step 404, connection information is sent. The imaging device 401, at step 405, processes the connection information. For example, the connection information may include device ID of the GPS module 402, connection information, verification information, and others. The imaging device 401 generates a set of device information at step 406. The device information includes, for example, camera information and device ID associated with the imaging device 401. The imaging device 401 sends the device information to the information device 402 at step 407. Upon receiving the device information, the GPS module 402 registers the imaging device 401 at step 408. The GPS module 402 stores the device information of the imaging device at step 409. By having stored device information of the imaging apparatus 401, the GPS module 402 can quickly connect to the imaging device 401 when needed.

In a specific embodiment, the GPS module 402 broadcasts the existence of a network. The wireless interface module (e.g., Eyefi card) inside the imaging device and/or the imaging device itself joins the network and opens a communication link. The wireless interface module inside the imaging device and/or the imaging device itself sends a request to upload first set of data. The GPS module 402 receives a first set of data and generates second set of data from first set of data, location information, user input information, barcode information etc.

In an embodiment, the network could be created by the wireless interface module inside the imaging device and/or the imaging device itself first. The GPS module 402 joins the network created by that imaging device or the portable device inside the imaging device. The communication link could be opened by either GPS module 402 first, by the wireless interface module inside the imaging device, or by the imaging device itself first. The GPS module 402 can then transmit the location information, barcode information, user input information, etc., to the wireless interface device inside the imaging device or the imaging device itself or.

The GPS module 300 may be configured to work with digital devices in various ways. In a preferred embodiment, the present invention provides a method for adding location information to images. The method comprises the following steps:

1. The user captures a picture on his digital device.
2. The picture information is then stored on a Wireless Technology Module, such as an EyeFi card.
3. An indication is sent from the Wireless Technology Module (WTM) to a GPS module as soon as a new event/activity is observed on the WTM. This event could be a simple indication (e.g., like a character "w") of activity, the actual time recorded within the activity, the filename, and/or others.
4. This transmitted information is stored on the GPS module.
5. The transmitted information (activity or event) is then bound to a track log (e.g., log of location and heading data) that is already stored in the memory of the GPS module. If the track log does not exist, a new track log is created. The binding process is further described as follows.
   a. Record the time as soon as the activity/event indication is received from the digital device.
   b. Match the activity time with time on the track log.
   c. Bind the activity information (file name etc.) to the actual location (e.g., latitude and longitude) information from the track log to create a new modified track log.
   d. The digital picture is then modified to include the latitude and longitude in the EXIF header of the image or append the information to the digital picture. This can be done by the following steps:
      i. Download the image (after each image is recorded) or images (in a batch) stored in the WTM onto the GPS module.
      ii. Algorithms in the GPS module will then match the activity (e.g., time of transfer, filename, etc.) to the actual image in real time and create a modified image file with embedded location and/or heading data.
      iii. As an alternative, the above step can be done offline, by downloading the digital images from the Digital devices and the modified track log separately into a PC or similar device.
      iv. The modified image file can then be converted to various file formats accepted by various mapping software like Google Earth, MS Maps, etc., in real time or offline.

In another embodiment, the present invention provides a method for adding location information to images. The method comprises the following steps:

1. The user captures a picture on his digital device.
2. The picture information is then stored on a Wireless Technology Module.
3. The WTM sends picture to the GPS module as soon as a new image file is stored on the WTM.
4. The transmitted information stored on the GPS module.
5. The transmitted image is then bound to the track log (log of location and heading data) that is already stored in the memory of the GPS module. The binding process is further described as follows:
   a. Record the time as soon as the digital file is received from the WTM.
   b. Then match the file received and/or stored time with time on the Track log.
   c. The digital picture is then modified to include the latitude and longitude in the EXIF header of the image or append the information to the digital picture in real-time or offline.
   d. Store the modified image on the local memory of the GPS module or
   e. Send the modified image back to be stored on the WTM.

In yet another embodiment, the present invention provides a method for adding location information to images. The method comprises the following steps:

1. The user captures a picture on his digital device.
2. The picture information is then stored on a Wireless Technology Module.
3. The Wireless Technology Module (WTM) requests the position/direction information from the GPS module.
4. GPS module transmits location I direction information to the WTM.
5. This transmitted information would then be stored on the WTM.
6. The transmitted image is then bound to the picture on the WTM. The binding process is further described as follows:
   a. Record the location/direction and time as soon as the information is received on the WTM.
   b. Then match the image file stored with the information received from the GPS module. The binding parameters can be time or offset of time.
   c. The digital picture is then modified to include the latitude and longitude in the EXIF header of the image or append the information to the digital picture in real-time or offline.
   d. Store the modified image on the WTM.
   e. Send the modified image back to be stored on the GPS module.

It is to be understood that various steps described above are exemplary processes performed between a GPS module and an imaging device. Depending on the specific application, various steps may be added, removed, modified, replaced, rearranged, repeated, and/or overlapped.

According to an embodiment, the present invention provides a data processing device.

As an example, the data process device is illustrated in FIG. 3 and described above. The device includes a housing. The device also includes a battery positioned within the housing. The device additionally includes a wireless communication interface that is adapted to wirelessly send and receive data with one or more imaging devices. The device further includes a location module that is configured retrieve position information from at least three or more satellites. The device further includes a memory module being configured to store at least the location information. The device includes a processor that is configured to receive a first signal from a first imaging device. The first signal indicates capturing of one or more images at a first time. The processor also receives a first set of data from the image device via the wireless communication interface. The processor further obtains a first location information from the location module. The processor generates a second set of data, the second set of data including an association between the first set of data and the first location information. The processor stores the second set of data.

The device can also comprise a data storage module for storing images captured by the first image device.

The device of may additionally comprises a hot-shoe adapter coupled to the housing, the hot-shoe adapter being configured to secure the device onto a camera.

In an embodiment, the device further comprises a display that is configured to show at least status information.

The wireless communication interface can be associated with one or more WIFI standards. The wireless communication interface can also be associated with one or more Bluetooth standards.

The location module may comprise a GPS receive, an accelerometer module, and/or a gyroscope. For example, the location module is configured to perform a triangulation process.

In certain embodiments, the device further comprises flash triggering module. The processor can be further configured to generate a track log based one or more location information.

The device may also includes a barcode scanning module, and the processor is configured to receive bar code data from the barcode scanning module and stored the bar code data as a part of the second set of data. The device can also include a USB interface for connecting to a computer device. As an example, the processor is configured to establish a connection with a computer device. In another example, the processor is configured to wake up the data processing device in response to the receiving the first signal. The processor can be used to establish a secured wireless connection with the first imaging device via the wireless communication interface.

In certain embodiments, the device further comprises a voice recording module and/or a touch screen display module that is adapted to receive user input.

According to another embodiment, the present invention provides an apparatus for associating location information with images. As an example, the apparatus is illustrated in FIG. 3 and described above. The apparatus includes a housing. The apparatus also includes a battery positioned within the housing. The apparatus includes a wireless communication interface that is adapted to wirelessly send and receive data with one or more imaging devices. The apparatus includes a location module that is configured retrieve position information from at least three or more satellites. The apparatus includes a memory module being configured to store at least the location information and configuration information associated with one or more imaging devices. The apparatus also includes a user interface module for receiving user inputs. The apparatus also includes a display module. The apparatus includes a processor being configured to receive a first signal from a first imaging device. The first signal indicates capturing of one or more images at a first time. The processor also verifies a first configuration information associated with the first imaging device. The processor receives a first set of data from the image device via the wireless communication interface. The processor obtains a first location information from the location module. The processor generates a second set of data that include an association between the first set of data and the first location information. The processor stores the second set of data. The apparatus also includes a power control module that is configured to activate the apparatus in response to the first signal.

In various embodiments, the processor is configured to broadcast a wireless signal, receive a response from the first imaging device, establish connection with the first imaging device, and store a configuration profile associated with the first imaging device.

According to yet another embodiment, the present invention provides a method for embedding location information into digital files. The method includes providing a portable apparatus that has a location module and a wireless interface. The method includes receiving a first message by the portable apparatus via the wireless interface. The first message includes wireless configuration information associated with the first portable apparatus. The method also includes receiving a second message from a first imaging device by the portable apparatus via the wireless interface. The second message is a response to the first message, the second message including wireless configuration information associated with the first imaging device. The method includes determining the wireless configuration information by the portable apparatus. The method further includes receiving a third message from the first imaging device by the portable apparatus via the wireless interface. The third message indicates capturing of one or more images by the first imaging device. The method includes forming a wireless connection between the portable apparatus and the first imaging device. The method includes determining a first location by the portable apparatus using the location module. The first location is determined within a predetermined period from receiving the third message, the predetermined period being less than ten minutes. The method includes generating a first file by the portable apparatus. The first file includes at least an identification information associated with the one or more images and the first location. The method includes storing the first file by the portable apparatus. In certain embodiments, the method includes receiving one or more user inputs. The method also includes generating a set of data based on the user input. The method further includes embedding the set of data into the first file. The method may also include forming a connection between the portable apparatus and a computing device and sending the first file to the computing device. The method can also includes receiving a first image file by the portable apparatus from the first imaging device via the wireless interface, embedding the first location into the first image file, and storing the first image file by the portable apparatus. In an embodiment, the method includes forming a wireless connection between the portable apparatus and a second imaging device, the second imaging device being adapted to capture videos. The method may also comprise waking up the portable apparatus from a power saving mode in response to receiving the third message.

In various embodiments, the first imaging comprises an Eye-fi device. The location module comprises a GPS receiver for receiving GPS signals from three or more satellites. For example, the location module is adapted determine the first location by triangulating wireless signals.

The portable apparatus may further include a housing, the housing being characterized by a total volume of less than 30 cubic inches. The portable apparatus includes a battery, a processor module, and a storage module. The apparatus may include a liquid crystal display. The wireless interface can be in compliance with Bluetooth or WIFI wireless standards. Also, the apparatus may also include a hard disk.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. An apparatus for associating location information with images, the apparatus comprising:
   a housing;
   a battery positioned within the housing;
   a wireless communication interface, the wireless communication interface being adapted to wirelessly send and receive data with one or more imaging devices;
   a location module, the location module being configured to retrieve position information from at least three or more satellites;
   a memory module being configured to store at least the location information and configuration information associated with one or more imaging devices;
   a user interface module for receiving user inputs;
   a display module;
   a processor being configured to:
      receive a first signal from a first imaging device, the first signal indicating capturing of one or more images at a first time;

verify a first configuration information associated with the first imaging device;

receive a first set of data from the image device via the wireless communication interface;

obtain a first location information from the location module;

generate a second set of data, the second set of data including an association between the first set of data and the first location information;

store the second set of data;

broadcast a wireless signal;

receive a response from the first imaging device;

establish connection with the first imaging device; and store a configuration profile associated with the first imaging device.

2. A method for embedding location information into digital files, the method comprising:

providing a portable apparatus, the apparatus having a location module and a wireless interface;

a first message by the portable apparatus via the wireless interface, the first message including wireless configuration information associated with the first portable apparatus;

receiving a second message from a first imaging device by the portable apparatus via the wireless interface, the second message being a response to the first message, the second message including wireless configuration information associated with the first imaging device;

determining the wireless configuration information by the portable apparatus;

receiving a third message from the first imaging device by the portable apparatus via the wireless interface, the third message indicating capturing of one or more images by the first imaging device;

forming a wireless connection between the portable apparatus and the first imaging device;

determining a first location by the portable apparatus using the location module, the first location determined within a predetermined period from receiving the third message, the predetermined period being less than ten minutes;

generating a first file by the portable apparatus, the first file including at least an identification information associated with the one or more images and the first location; and storing the first file by the portable apparatus.

3. The method of claim 2 wherein the first imaging comprises a Eye-fi device.

4. The method of claim 2 wherein the location module comprising a GPS receiver for receiving GPS signals from three or more satellites.

5. The method of claim 2 wherein the location module is adapted to determine the first location by triangulating wireless signals.

6. The method of claim 2 further comprising:

receiving one or more user inputs;

generating a set of data based on the user input; and embedding the set of data into the first file.

7. The method of claim 2 further comprising:

forming a connection between the portable apparatus and a computing device; and sending the first file to the computing device.

8. The method of claim 2 further comprising:

receiving a first image file by the portable apparatus from the first imaging device via the wireless interface;

embedding the first location into the first image file; and storing the first image file by the portable apparatus.

9. The method of claim 2 wherein the portable apparatus further comprising:

a housing, the housing being characterized by a total volume of less than 30 cubic inches;

a battery;

a processor module; and a storage module.

10. The meted of claim 2 further comprising waking up the portable apparatus from a power saving mode in response to receiving the third message.

* * * * *